E. Tush.
Corn Harvester.

No. 99,034.  Patented Jan. 18, 1870.

Witnesses
Wm H Seaman
W H Dennis

Inventor
Elwood Tush
By his Atty J Dennis Jr

United States Patent Office.

ELWOOD TUSH, OF MANCHESTER, IOWA.

Letters Patent No. 99,034, dated January 18, 1870.

CORN-HARVESTER.

The Schedule referred to in these Letters Patent and making part of the same.

*To all whom it may concern:*

Be it known that I, ELWOOD TUSH, of Manchester, Delaware county, in the State of Iowa, have invented certain new and useful Improvements in Corn-Pickers or Harvesters; and I do hereby declare the following to be a full and exact description thereof, reference being had to the accompanying drawings, forming part of this specification.

The nature or essence of my invention consists in the peculiar construction and arrangement of devices for picking or harvesting the ears of standing corn, which are described and claimed in the following specification, and represented in the drawings referred to.

In the accompanying drawings—

In these drawings—

A A are the wheels, one or both of which are fastened to the axle B, to turn it and operate the machine.

Figure 1:
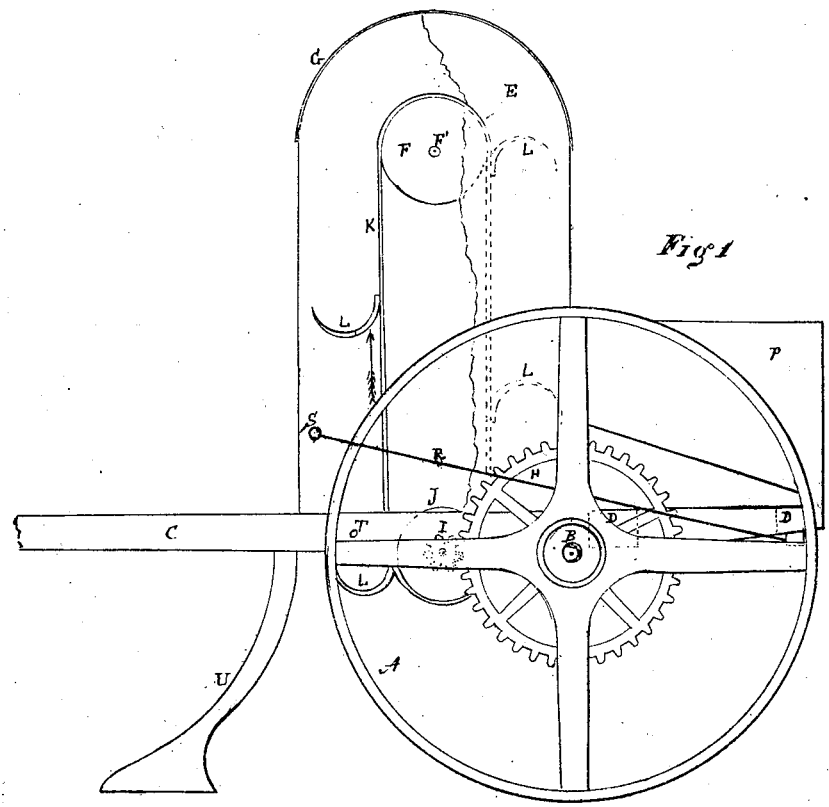
Figure 1 is a side elevation of my machine; some of the parts are broken away to show the others more clearly.
Figure 2:
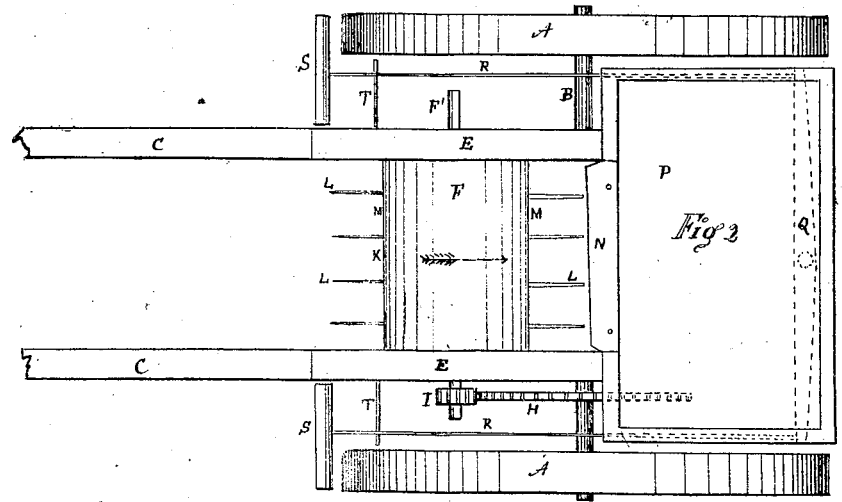
Figure 2 is a plan or top view, without the curved plate that covers the stands and cylinders.

This axle B is fitted to turn in scores in the shafts or thills C C, and secured in the scores by proper caps, fastened to the shafts. These shafts are connected together in rear of the axle, by the bars D D, shown by dotted lines in fig. 1, and extend forward, and are supported by the animals that draw the machine.

In the shafts C C, I fasten two standards, E, of plank, to support the upper roller F, with its shaft F', which is fitted to turn freely in the standards E, which are connected together at the top by the plate G, of sheet-metal, as shown in the drawing.

The gear H is fastened to the axle B, to turn the pinion I and lower roller J, which is arranged on a shaft turning in scores in the under sides of the shafts C.

The apron or belt K surrounds the rollers F and J, and, as the machine is drawn, the forward side of the belt moves up in the direction of the arrow, and carries the rows of hooks L L, fastened to the bars M, which bars are fastened to the belt, by rivets or otherwise.

The hooks L L have knife-edges, to cut the ears of corn from the standing stalks, and carry them up over the roller F, when they fall on the inclined plane N, and descend into the box P on the rear ends of the shaft C, which box, when filled, may be emptied in some convenient manner.

The double-tree Q is arranged to vibrate on a bolt in the rear bar D, and from each end of Q the rods R R extend forward to the single-trees S S, forward of the wheels, to which the animals are hitched, so as to travel outside of the shafts, and draw the machine.

The bars T T are fastened in the shafts C, to hold up the forward ends of the rods R, as shown in the drawing. And the forward ends of the shafts may be held up by pole-straps from the hames, or by a yoke across the animals' necks or backs.

The gathering-arms or feet, U, are fastened to the shafts, and project forward to raise up and gather in any inclined stalks, into the path of the hooks L L.

In using this machine, the shafts C C pass each side of the row of corn being gathered, and the animals which draw the machine, travel outside of the shafts, so as not to disturb the row of standing corn being gathered. If the shafts C C are supported by a yoke across the necks or backs of the animals, it will leave the front ends of the shafts open and unobstructed, so that the shafts will pass each side of the row of corn being gathered by the hooks.

Having described my improvements in machines for picking or gathering corn,

I claim, as my improvement in corn-harvesters,

The arrangement, with the receiving-box P, of the two pulleys, F and J, belt K, and cutting-hooks L, operated by the gears H and I, from the axle B, all substantially as described.

ELWOOD TUSH.

Witnesses:
S. L. DOGGETT,
CHAS. C. LEWIS.